C. B. SAWYER.
BALANCE ELEVATOR.
No. 103,375.  Patented May 24, 1870.
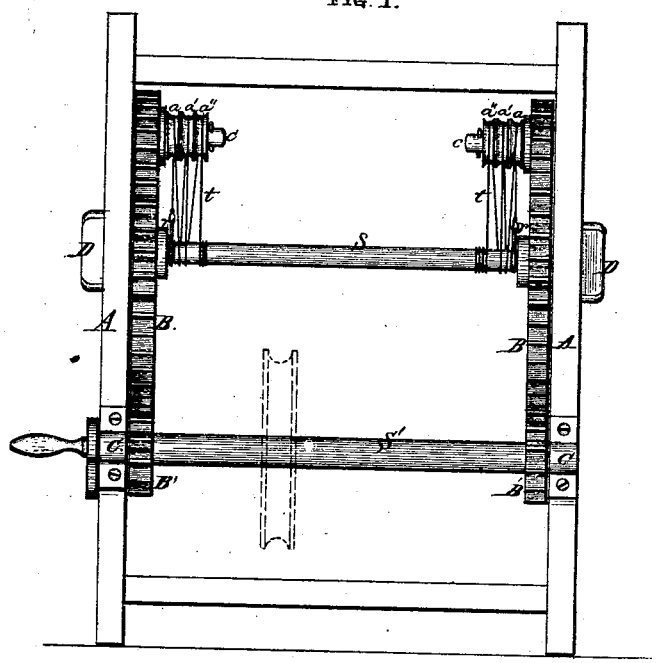
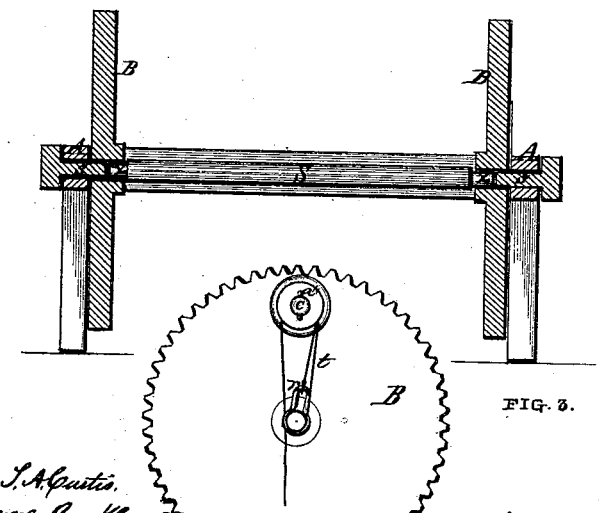

United States Patent Office.

CHARLES B. SAWYER, OF FITCHBURG, ASSIGNOR FOR ONE-HALF HIS RIGHT TO JOHN W. LABAREE, OF SPRINGFIELD, MASSACHUSETTS.

Letters Patent No. 103,375, dated May 24, 1870.

IMPROVED BALANCE ELEVATOR

The Schedule referred to in these Letters Patent and making part of the same.

*To all whom it may concern:*

Be it known that I, CHARLES B. SAWYER, of Fitchburg, in the county of Worcester and State of Massachusetts, have invented a new and useful Improvement in Balance Elevators; and I do hereby declare that the following is a full, clear, and exact description thereof, reference being had to the accompanying drawings making part of this specificification, and to the letters of reference marked thereon, in which—

Figure 1 is a plan view of my invention;

Figure 2 is a vertical section through line E F of fig. 1; and

Figure 3 is a transverse section of the winding-shaft, showing the arrangement of the pulley, shaft, and cord.

My invention relates to an apparatus used for raising weights, and is, perhaps, more appropriate for use in stores and warehouses, although it may be used for moving heavy bodies, and applied to use in any direction; and It consists of a toothed wheel, properly secured upon a bearing, so that it may rotate freely thereon.

A hole or socket is made in the center of said wheel, in which one end of a shaft has its bearing, the other end of said shaft having its bearing in a similar hole, made either in another wheel or in the frame, and the ends of the shaft, which have their bearings in these holes, should be simewhat smaller in diameter than the holes themselves.

Upon the side of this toothed wheel, and at a convenient distance from the shaft, is fixed a short shaft or spindle, having two or more pulleys thereon. A suitable metallic hook or loop is placed over the small end of the shaft, so that said shaft may rotate freely therein, and to this hook or loop is secured the end of a cord or rope. The cord is then passed over the first or inside pulley, then around the shaft and over the second pulley, and then around the shaft again, and so on, according to the number of pulleys desired. Two or three pulleys will be quite sufficient for an operative and practical elevating-machine.

Another shaft, having a small pinion thereon gearing with the toothed wheel, and operated by means of a pulley and cord, or by a winch, serves to apply the motive power to the toothed wheel and pulleys.

In the drawings—

A represents a frame, through which extends, in a horizontal direbtion, the shafts *s s*, having firmly secured thereto the toothed wheels B, said wheels having a hole or socket upon the inside at the center, into which are inserted the ends of the shaft S.

The ends *x* of this shaft are made somewhat smaller in diameter than the holes or sockets in which they rest, so that the shaft S, when in place, is entirely independent of the toothed wheels B, and is somewhat loose in its bearings.

The loop or hook *r* may be made of metal or other suitable material, and is placed upon the end *x* of the shaft S, and to this loop or hook *r* is secured the end of the cord or rope *t*.

Firmly secured to the inside of the wheel B, at any convenient distance from its center, is the shaft or spindle *c*, having two or more pulleys, $a\ a'\ a''$, thereon.

A shaft, S', having its bearings at C C upon the frame A, and having the pinions B' thereon, gearing into the toothed wheels B, serves to give a rotary motion to the toothed wheels B, and the power may be applied to the shaft S' by means of the common pulley and cord, or by a winch, *f*, or any other convenient manner.

The cord, which is attached at one end to the loop or hook *r*, passes over over the first pulley, *a*, from thence to the same side of the shaft S, over that, and back to and around the second pulley, $a'$, from thence back to and around the shaft again, and then back to and around the third pulley, $a''$, and, finally, back to and around the shaft S, and then is suspended any desired length from said shaft S.

The operation of the device is as follows:

If a weight be attached to the suspended end of the cord *t*, and power be applied to the shaft S', the toothed wheels B and the series of pulleys $a\ a'\ a''$ is caused to revolve around the shaft S, and, the cord, passing over the said series of pulleys, is drawn taut, drawing the end of the shaft firmly against that side of its socket or bearing nearest the series of pulleys, the end of the cord which is attached to the hook or loop *r* drawing upon the end of the shaft S, in proportion to the weight being raised, according to the number of pulleys used in the series.

By this construction, I obtain a device which might be termed a revolving sheave or tackle-block, combining the power of the sheave-block with that of the windlass, and obtain, as a result, a very great increase of power; and am, also, enabled to gain another very desirable advantage over the common elevators now in use, which is this: as the rope or cord passing from the shaft S to the series of pulleys and back is nearly evenly distributed upon each side of the shaft, the raising power is, also, correspondingly divided or distributed upon each side, and, as a result, if the weight, which is attached to the cord suspended from the shaft S, be partially raised, or raised to any height, and the power be released from the shaft S', the weight will hang suspended at any point without the application of any brake or holding-power, and without unwinding the rope or turning the shaft in the opposite direction.

As the power is so evenly balanced, the apparatus ill remain in any position in which it may be left, of itself, even with any weight suspended upon the end of the rope below the shaft, which is an important feature of the device.

There may be two wheels B, and two series of pulleys *a a' a''*, as shown in the drawing, or a single wheel, B, may be used, in which case one end, *x*, of the shaft S may have its bearing in the central cavity in the wheel B, the other end having its bearing in a similar cavity in the frame A, two pinions, B', being required if two wheels, B, are used, to give them both an equal rotary motion.

Having thus described my invention,

What I claim as new, and desire to secure by Letters Patent, is—

1. The independent shaft S, when used in connection with one or more toothed wheels, B, having two or more rolls, *a a'*, attached thereto, substantially as described.

2. The loose shaft S, in combination with the series of pulleys *a a' a''*, revolving around said saft, constructed substantially as described.

3. An improved elevator, consisting of the pinion B', toothed wheel B, having the series of pulleys *a a' a''* attached thereto, the loose shaft S, and cord *t*, all constructed and operating substantially as described.

CHARLES B. SAWYER.

Witnesses:
T. A. CURTIS,
M. L. BOYNTON.